United States Patent [19]
Hirose et al.

[11] 3,723,457
[45] Mar. 27, 1973

[54] INDOLINE-2-ONE DERIVATIVES AND PREPARATION THEREOF

[75] Inventors: Noriyasu Hirose; Shigeru Souda, both of Tokyo, Japan

[73] Assignee: Eisai Co., Ltd., Tokyo, Japan

[22] Filed: Sept. 21, 1970

[21] Appl. No.: 74,164

[30] Foreign Application Priority Data

Sept. 30, 1969 Japan ................................. 44/77438
Sept. 30, 1969 Japan ................................. 44/77439
Sept. 30, 1969 Japan ................................. 44/77440
Sept. 30, 1969 Japan ................................. 44/77441

[52] U.S. Cl. ............................. 260/325, 424/274
[51] Int. Cl. ........................................ C07d 27/40
[58] Field of Search .................................. 260/325

[56] References Cited

UNITED STATES PATENTS 2,759,935    8/1956    Speeter ..................... 260/247.2

OTHER PUBLICATIONS

Hallmann, Berichte 95: 1138–43 (1962)

Primary Examiner—Donald G. Daus
Assistant Examiner—Joseph A. Narcavage
Attorney—Henry T. Burke, Robert Scobey, Robert S. Dunham, P. E. Henninger, Lester W. Clark, Gerald L. Griffin, Thomas F. Moran, R. Bradlee Boal and Christopher C. Dunham

[57] ABSTRACT

Indoline-2-one derivatives, more particularly, 1-benzyl-3-substituted or unsubstituted-aminomethyl-3-hydroxy-indoline-2-one derivatives and their pharmacologically acceptable salts as well as the methods for synthesis thereof. The compounds are new and possess strong analgesic and anti-inflammatory activities with low toxicity and accordingly they are useful for therapeutic purposes.

6 Claims, No Drawings

INDOLINE-2-ONE DERIVATIVES AND PREPARATION THEREOF

This invention relates to indoline-2-one derivatives, new substances, and synthetic preparation thereof. More particularly the present invention is concerned with 1-benzyl-3-substituted or unsubstituted-aminomethyl-3-hydroxy-indoline-2-one derivatives and their pharmacologically acceptable salts as well as the methods for synthesis thereof.

The new indoline-2-one derivatives with which the present invention is concerned are represented by the formula

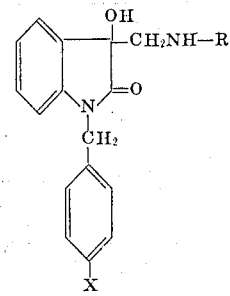

(I)

wherein R is H, $-CH(CH_3)_2$, lower alkylcarbonyl, benzoyl or $-CONH_2$ group and X is H or halogen atom.

It has been found that the compounds of formula (I) of the present invention exhibit outstanding analgesic and anti-inflammatory activities with low human toxicity and therefore are useful for therapeutic purposes.

The pharmacological activities of the new compounds as proved by the animal experiment described below are superior to those exhibited by the compounds of pyrine series such as, for example, aminopyrine and phenylbutazone which have popularly been employed in the clinical field.

The animal experiment was carried out on mice to evaluate the inhibition activity of the compounds against the stretching caused by intraperitoneal injection of a 0.5 percent aqueous acetic acid solution. At the same time control tests were also carried out in the same manner utilizing aminopyrine and phenylbutazone.

Sixty adult mice were divided into two groups, i.e., Group A and Group B.

Each of Groups A and B was further divided into Subgroups $A_1$, $A_2$, $A_3$, $A_4$, $A_5$ and $A_6$ and Sub-groups $B_1$, $B_2$, $B_3$, $B_4$, $B_5$ and $B_6$, the respective Sub-groups involving five animals. To each of the five animals of the respective Sub-groups $A_1$ to $A_6$ inclusive was intraperitoneally administered 25 mg/kg of the compounds a, b, c, d, e and f, while to each of the five animals of the respective Sub-groups $B_1$ to $B_6$ inclusive was intraperitoneally administered 50 mg/kg of the compounds a, b, c, d, e and f. The compounds a, b, c, and d belong to the indoline-2-one compounds of the general formula (I) according to the present invention and contain respectively the following substituents.

| Compounds | R | X |
|---|---|---|
| a | $-CO-\langle\rangle$ | H |
| b | $-CONH_2$ | H |
| c | $-COHN_2$ | Cl |
| d | $-CH(CH_3)_2$ | Cl |

Compound e is aminopyrine having the formula

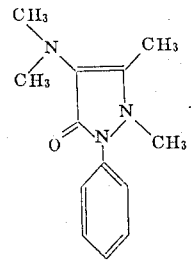

and compound f is phenylbutazone having the formula

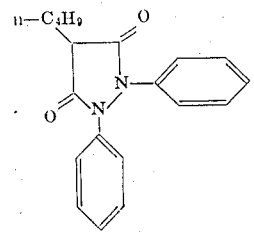

All the compounds under test including those of the present invention and of the control were provided respectively in a form of a Tyrode solution. Analgesic activities of the compounds under test were evaluated and ranked as "perfect" when stretching on an animal previously treated with the compound under test could not be observed upon subsequent administration of acetic acid solution.

The results observed are tabulated:

| Compounds under Test | Admin-'tion mg/kg | Sub-groups each contains 5 mice | Nos. of Mice in Perfect Inhibition against Stretching | Relative Inhibition Activities (%) |
|---|---|---|---|---|
| a | 25 | $A_1$ | 3 | 60 |
| b | 25 | $A_2$ | 3 | 60 |
| c | 25 | $A_3$ | 4 | 80 |
| d | 25 | $A_4$ | 2 | 40 |
| e (control) | 25 | $A_5$ | 1 | 20 |
| f (control) | 25 | $A_6$ | 1 | 20 |
| a | 50 | $B_1$ | 3 | 60 |
| b | 50 | $B_2$ | 4 | 80 |
| c | 50 | $B_3$ | 4 | 80 |
| d | 50 | $B_4$ | 3 | 60 |
| e (control) | 50 | $B_5$ | 3 | 60 |
| f (control) | 50 | $B_6$ | 2 | 40 |

As is evident from the above data, compounds a to d inclusive of the present invention and especially compound c which contains the substituents $R=-CONH_2$ and $X=Cl$ show a notable analgesic activity.

It has been found furthermore that compounds according to the present invention possess a markedly low toxicity. $LD_{50} \geq 300$ mg/kg was observed when compound c was intraperitoneally administrated to mice. In consideration of the said $LD_{50}$ value as compared with $LD_{50}=180$ mg/kg of phenylbutazone which is known to be less toxic than aminopyrine, it is apparent that the new compound of the present invention can be used as medicament without fear of harmful toxicity.

The new compounds can be obtained by catalytic reduction of selected 1-benzyl-3-hydroxy-3- nitromethyl-indoline-2-one compounds, the latter compound being obtainable by the reaction of 1-benzyl-isatin and nitromethane.

In a particular case, the compound of the formula (I) wherein the substituent R is $-CH(CH_3)_2$, can advantageously be obtained in a single step by carrying out the catalytic reduction of the abovementioned 1-benzyl-3-hydroxy-3-nitromethyl-indoline-2-one compound in excess amount of acetone utilizing a catalyst such as platinum oxide, Raney Nickel, or palladium-carbon. The excess amount of the acetone serves partly as one of the reactants entering into formation of the intended final product and partly as the reaction medium of the system.

Ethyl acetate was found to be the most preferable solvent for carrying out recrystallization of the resulting reaction product.

Alternatively, in case a compound embraced by the formula (I) wherein the substituent R is other than $-CH(CH_3)_2$ is desired, the said compound may advantageously be obtained first by catalytic reduction of the 1-benzyl-3-hydroxy-3-nitromethyl-indoline-2-one compound by the aid of a catalyst such as aforementioned in a solvent inactive to the amino group in the resulting reduction product, i. e., the compound of the formula (I) wherein R is H. The resulting compound, if desired, may further be converted into a compound containing a substituent $-CONH_2$ for R, for example, by subjecting the former compound to react with an alkali metal cyanate such for example potassium or sodium cyanate.

Alternatively, if a corresponding compound containing a lower alkylcarbonyl or benzyl group for the substituent R, for example, is desired, said compound may be obtained by reacting the aforementioned compound, wherein the radical R is H, with a desired lower alkylcarbonyl halogenide or benzoyl halogenide.

Typical 1-benzyl-3-hydroxy-3-nitromethyl-indoline-2-one compounds which can be employed as starting material to carry out the process of the present invention include 1-benzyl-3-hydroxy-3-nitromethyl-indoline-2-one melting at 125°–127°C. and 1-(p-chlorobenzyl)-3-hydroxy-3-nitromethyl-indoline-2-one melting at 101°–102°C.

The following examples are given to illustrate the process of the invention, but the invention is not construed as to be restricted to the examples.

EXAMPLE 1

Preparation of 1-benzyl-3-hydroxy-3-isopropyl-aminomethyl-indoline-2-one

6 Grams of 1-benzyl-3-hydroxy-3-nitromethyl-indoline-2-one, 0.2 grams of platinum oxide as catalyst and 200 ml of acetone were charged in an autoclave. A catalytic reduction under high pressure of the content of the autoclave was carried out with the initial pressure of 60 atms. of gaseous hydrogen and the reaction temperature of 80°C. for a time sufficient to complete the reduction. After that time, the reaction mixture was taken up and filtered to remove the spent catalyst. By concentrating the filtrate, there was obtained an oily substance which was dissolved in a suitable amount of ethyl acetate. The crystalline substance separated out was recovered and recrystallized from ethyl acetate colorless needles melting at 115°–116°C. were obtained.

Elementary analysis of the product gave:

|  | C | H | N |
|---|---|---|---|
| Calculated (%) as $C_{19}H_{22}N_2O_2$: | 73.52 | 7.14 | 9.03 |
| Found (%): | 73.82 | 7.34 | 8.72 |

EXAMPLE 2

Preparation of 1-(p-chlorobenzyl)-3-hydroxy-3-isopropylaminomethyl-indoline-2-one 6.6 Grams of 1-(p-chlorobenzyl)-3-hydroxy-3-nitromethyl-indoline-2-one, 0.3 grams of palladium black carried on carbon and 200 ml of acetone were charged in an autoclave and further worked up in accordance with the procedure of the preceding example.

There were obtained colorless needles melting at 155°C.

Elementary analysis of the product gave:

|  | C | H | N |
|---|---|---|---|
| Calculated (%) as $C_{19}H_{21}ClN_2O_2$: | 66.18 | 6.14 | 8.12 |
| Found (%): | 66.09 | 5.90 | 8.13 |

EXAMPLE 3

Preparation of 1-benzyl-3-aminomethyl-3-hydroxy-indoline-2-one

6 Grams of 1-benzyl-3-hydroxy-3-nitromethyl-indoline-2-one, 3 ml of acetic acid, 0.1 gram of platinum oxide and 200 ml of ethanol were charged in an autoclave. The high pressure reduction of the content of the autoclave with an initial gaseous hydrogen pressure at 60 atms. was carried out for the time sufficient to complete the reduction. The reaction mixture was then filtered to remove the spent catalyst, and the filtrate was concentrated by evaporation under reduced pressure. A dilute aqueous solution of caustic alkali was added to the concentrate to isolate the resulting amine which was extracted with ether.

By passing dry hydrogen chloride through the etheral extract, the hydrochloride of the contemplated compound was crystallized out which was recovered by filtration. The crystalline substance was purified by recrystallization from isopropanol.

The hydrochloride of the compound had a melting point of 175°–176°C.

Elementary analysis of the product gave:

|  | C | H | N |
|---|---|---|---|
| Calculated (%) as $C_{16}H_{16}N_2O_2 \cdot HCl$: | 63.04 | 5.62 | 9.20 |
| Found (%): | 62.97 | 5.67 | 9.31 |

EXAMPLE 4

Preparation of 1-(p-chlorobenzyl)-3-aminomethyl-3-hydroxy-indoline-2-one 3.3 Grams of 1-(p-chlorobenzyl)-3-hydroxy-3-nitromethyl-indoline-2-one, 0.15 grams of platinum oxide as catalyst and 200 ml of ethanol were charged together in a catalytic reduction device to be operated at ordinary pressure.

A current of hydrogen was passed through the device until the theoretical quantity of the hydrogen was consumed. The reduction product was further worked up in accordance with the procedure as mentioned in Example 3.

The product thus obtained as hydrochloride had a melting point of 193°–195°C.

Elementary analysis of the product gave:

|  | C | H | N |
|---|---|---|---|
| Calculated (%) as $C_{16}H_{15}ClN_2O_2 \cdot HCl$: | 56.64 | 4.76 | 8.26 |
| Found (%): | 56.60 | 4.75 | 8.48 |

EXAMPLE 5

Preparation of 1-benzyl-3-carbamylaminomethyl-3-hydroxy-indoline-2-one 3.0 Grams of 1-benzyl-3-aminomethyl-3-hydroxy-indoline-2-one hydrochloride were suspended in 25 ml of water. To the suspension was added an aqueous solution of 2.7 grams of potassium cyanate dissolved in 10 ml of water. The mixture thus obtained was stirred at room temperature for 3 hours. At that time, a crystalline substance separated out which was recovered by filtration and recrystallized from ethanol. The colorless needles thus obtained had a melting point of 213°C.

Elementary analysis of the product gave:

|  | C | H | N |
|---|---|---|---|
| Calculated (%) as $C_{17}H_{17}N_3O_3$: | 65.68 | 5.50 | 13.15 |
| Found (%): | 65.41 | 5.63 | 13.71 |

EXAMPLE 6

Preparation of 1-(p-chlorobenzyl)-3-carbamylaminomethyl-3-hydroxy-indoline-2-one 3.4 Grams of 1-(p-chlorobenzyl)-3-aminomethyl-3-hydroxy-indoline-2-one hydrochloride were reacted with 2.7 grams of potassium cyanate according to the procedure given in Example 5. The colorless needles obtained by recrystallization of the resulting product had a melting point of 213°–214°C.

Elementary analysis of the needles gave:

|  | C | H | N |
|---|---|---|---|
| Calculated (%) as $C_{17}H_{16}ClN_3O_3$: | 59.04 | 4.67 | 12.15 |
| Found (%): | 59.31 | 4.79 | 12.21 |

EXAMPLE 7

Preparation of 1-benzyl-3-benzoylaminomethyl-3-hydroxy-indoline-2-one $2^{HCl}$:

3.0 Grams of 1-benzyl-3-aminomethyl-3-hydroxy-indoline-2-one hydrochloride and 7.0 grams of benzoyl chloride were suspended in 70 ml of water. To the suspension under vigorous agitation were added 5.3 grams of sodium carbonate. The mixture was stirred for 3 hours at room temperature, and soon after that, crystals separated out which were recovered by filtration and recrystallized from ethanol. The needles thus obtained had a melting point of 165°–167°C.

Elementary analysis of the needles gave:

|  | C | H | N |
|---|---|---|---|
| Calculated (%) as $C_{23}H_{20}N_2O_3$: | 74.17 | 5.41 | 7.52 |
| Found (%): | 74.21 | 5.68 | 7.43 |

EXAMPLE 8

Preparation of 1-(p-chlorobenzyl)-3-benzoylaminomethyl-3-hydroxy-indoline-2-one 3.4 Grams of 1-(p-chlorobenzyl)-3-aminomethyl-3-hydroxy-indoline-2-one hydrochloride were reacted with 7.0 grams of benzoyl chloride and further worked up in accordance with the procedure disclosed in Example 7. The needles thus obtained had a melting point of 195°–196°C.

Elementary analysis of the needles gave:

|  | C | H | N |
|---|---|---|---|
| Calculated (%) as $C_{23}H_{19}ClN_2O_3$: | 67.89 | 4.72 | 6.89 |
| Found (%): | 68.11 | 4.74 | 6.73 |

EXAMPLE 9

Preparation of 1-(p-chlorobenzyl)-3-acetylaminomethyl-3-hydroxy-indoline-2-one 6.0 Grams of 1-(p-chlorobenzyl)-3-aminomethyl-3-hydroxy-indoline-2-one hydrochloride and 1.8 grams of glacial acetic acid were dissolved in 50 ml of benzene, and the resulting solution was refluxed for 4 hours. After cooling, the crystalline substance thus formed was recovered by filtration, and was then recrystallized from ethylacetate.

The colorless needles of the product melted at 123°–125°C.

Elementary analysis of the product gave:

|  | C | H | N |
|---|---|---|---|
| Calculated (%) as $C_{18}H_{17}ClN_2O_3$: | 62.70 | 4.98 | 8.13 |
| Found (%): | 63.02 | 4.99 | 7.97 |

What we claim is:

1. 1-Benzyl-3-carbamylaminomethyl-3-hydroxy-indoline-2-one and its pharmacologically acceptable salts.

2. 1-(p-Chlorobenzyl)-3-carbamylaminomethyl-3-hydroxy-indoline-2-one and its pharmacologically acceptable salts.

3. 1-Benzyl-3-benzoylaminomethyl-3-hydroxy-indoline-2-one and its pharmacologically acceptable salts.

4. 1-(p-Chlorobenzyl)-3-benzoylaminomethyl-3-hydroxy-indoline-2-one and its pharmacologically acceptable salts.

5. 1-Benzyl-3-acetylaminomethyl-3-hydroxy-indoline-2-one and its pharmacologically acceptable salts.

6. 1-(p-Chlorobenzyl)-3-acetylaminomethyl-3-hydroxy-indoline-2-one and its pharmacologically acceptable salts.

* * * * *